US011773003B2

(12) United States Patent
Min et al.

(10) Patent No.: US 11,773,003 B2
(45) Date of Patent: Oct. 3, 2023

(54) APPARATUS AND METHOD OF MANUFACTURING SHELL FOR RESONATOR USING LASER

(71) Applicant: HANWHA CORPORATION, Seoul (KR)

(72) Inventors: Seong Ho Min, Daejeon (KR); Jeong Youp Han, Daejeon (KR); Kwang Jin Kim, Daejeon (KR); Seong Hyun Son, Seoul (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 243 days.

(21) Appl. No.: 17/101,227

(22) Filed: Nov. 23, 2020

(65) Prior Publication Data

US 2021/0395130 A1 Dec. 23, 2021

(30) Foreign Application Priority Data

Jun. 17, 2020 (KR) ........................ 10-2020-0073359

(51) Int. Cl.
*C03B 23/035* (2006.01)
*G01C 19/5783* (2012.01)
(Continued)

(52) U.S. Cl.
CPC ...... *C03B 23/0357* (2013.01); *B23K 26/0093* (2013.01); *C03C 23/0025* (2013.01); *G01C 19/5783* (2013.01); *B23K 26/0869* (2013.01)

(58) Field of Classification Search
None
See application file for complete search history.

(56) References Cited

U.S. PATENT DOCUMENTS

| 2005/0183456 A1* | 8/2005 | Taplan | ................ C03B 23/0355 65/106 |
| 2017/0008791 A1* | 1/2017 | Kim | ........................ C03B 23/03 |
| 2018/0323514 A1 | 11/2018 | Pance et al. | |

FOREIGN PATENT DOCUMENTS

| EP | 1798206 A1 * | 6/2007 | ......... C03B 23/0305 |
| EP | 1826186 A2 * | 8/2007 | ......... C03B 23/0252 |

(Continued)

OTHER PUBLICATIONS

DE 196 03 974 machine translation, Hellwig Udo, Forming Reinforcing bulges in bodies or continuous materials, Aug. 1997. (Year: 1997).*

(Continued)

*Primary Examiner* — Queenie S Dehghan
(74) *Attorney, Agent, or Firm* — WHDA, LLP

(57) ABSTRACT

Proposed are an apparatus and a method of manufacturing a shell for a resonator using a laser. According to the apparatus and method, it is possible to stably manufacture 3D shells for a resonator in various shapes by applying heat through a laser and adjusting the degree of vacuum in a forming frame, it is possible to improve work safety and work efficiency, and it is possible to use various materials that are heated and deformed by a laser other than a glass material, thereby being able to increase generality of manufacturing. In particular, it is possible to accurately implement 3D shapes of a shell for a resonator such as a hemisphere or a semi-toroid, so it is possible to remarkably reduce a defective portion in manufacturing and the manufacturing cost, and considerably improve productivity.

11 Claims, 7 Drawing Sheets

(51) Int. Cl.
    *B23K 26/00*     (2014.01)
    *C03C 23/00*     (2006.01)
    *B23K 26/08*     (2014.01)

(56) References Cited

FOREIGN PATENT DOCUMENTS

| | | |
|---|---|---|
| JP | 9-20523 A | 1/1997 |
| KR | 10-2009-0089453 A | 8/2009 |
| KR | 10-2016-0097054 A | 8/2016 |
| KR | 10-2019-0142319 A | 12/2019 |

OTHER PUBLICATIONS

WO 2019155954 machine translation, Wada et al., Laser marking apparatus, Aug. 2019. (Year: 2019).*
CN 111468821 machine translation, Cao et al., Hot-melt tape laser heating device, Jul. 2020. (Year: 2020).*
CN 204094489 machine translation, Qian H, Translation Screw Thread Clamping Mechanism, Jan. 2015. (Year: 2015).*

\* cited by examiner

APPARATUS AND METHOD OF MANUFACTURING SHELL FOR RESONATOR USING LASER

CROSS REFERENCE TO RELATED APPLICATION(S)

This application claims the benefit of Korean Patent Application No. 10-2020-0073359, filed on Jun. 17, 2020, which is hereby incorporated by reference in its entirety into this application.

BACKGROUND OF THE INVENTION

1. Technical Field

The present disclosure relates to an apparatus and a method of manufacturing a shell for a resonator using a laser.

2. Description of the Related Art

In general, a gyroscope refers to a sensor that measures a rotation effect, and is theoretically based on basic principles such as angular momentum conservation, the Sagnac effect, or the Coriolis effect.

Optical gyroscopes such as a ring laser gyroscope or a fiber optic gyroscope that are currently widely used are theoretically based on the Sagnac effect, so the performance is improved in proportion of the size of sensors, and thus, there is a limitation in reducing the size of sensors.

However, the scale factor of a vibration type gyroscope that uses the Coriolis effect do not involve the sensors, so the vibration type gyroscope is advantageous in that the size of sensors can be reduced.

Further, studies about manufacturing a microchip-scale vibration type gyroscope have been reported with the development of the micromachining technology, and optical sensor technology is being developed into a micro-vibration type sensor technology for a chip scale. The present disclosure relates to manufacturing a shell resonator that is a key component of a micro-vibration type gyroscope.

A resonator, an electrode, and a vacuum frame may be considered as main components of a vibration type gyroscope.

The resonator of the main components is an important factor that determines the performance of a gyroscope and has been manufactured in a hemispherical shape or a semi-toroidal shape in order to increase the Q value.

As a technology of manufacturing a resonator in the related art, there is a glassblown method of manufacturing a shell resonator using a glass material and a deposition method that manufactures a shell resonator using a diamond material.

A defect of the glassblown method is that since it is required to heat the entire chamber to cause glass deformation, a large amount of energy is consumed, and since it is difficult to locally heat a glass substrate, it is difficult to cause fine glass deformation.

A method of depositing a solid substance such as diamond has the advantage that it is possible to manufacture a shell resonator in various shapes, depending on the shape of frames, but has the defect that since the Q value of a resonator is small, as compared with using a glass material, the performance of a gyroscope is deteriorated.

PRIOR ART DOCUMENT

Patent Document (Patent Document 1) Korean Patent Application Publication No. 10-2019-0142319 "Connected dielectric resonator antenna array and method of making the same" (published on 2019 Dec. 26)

SUMMARY OF THE INVENTION

An objective of the present disclosure is to provide an apparatus and a method of manufacturing a shell for a resonator using a laser, the apparatus and a method being able to stably manufacture a 3D shell for a resonator in various shapes by adjusting the degree of vacuum in a forming frame while heating the forming frame with a laser.

Another objective of the present disclosure is to provide an apparatus and a method of manufacturing a shell for a resonator using a laser, the apparatus and a method being able to precisely manufacture a 3D shell for a resonator in a predetermined shape by adjusting the degree of vacuum in a forming frame while heating the forming frame with a laser.

In order to achieve the objectives of the present disclosure, an embodiment of an apparatus for manufacturing a shell for a resonator using a laser includes: a shell-forming frame that has a shell-forming space having an open top and being able to form a shell for a resonator, and on which a substrate for manufacturing a shell that is deformed by a laser is disposed; a laser generator that thermally deforms the substrate for manufacturing a shell on the shell-forming frame by emitting a laser beam to the substrate for manufacturing a shell; and a vacuum pump unit that is connected to the shell-forming space and deforms the substrate for manufacturing a shell heated by the laser beam into a 3D shape by adjusting a degree of vacuum in the shell-forming space.

The vacuum pump unit may include: a vacuum pump suctioning air from the shell-forming space or supplying air into the shell-forming space; a vacuum line connecting the vacuum pump and the shell-forming space; and a vacuum degree control valve opening or closing a channel of the vacuum line, in which the vacuum pump and the vacuum degree control valve may be connected to a controller and controlled to operate by the controller, thereby adjusting the degree of vacuum in the shell-forming space.

The controller may include an air pressure sensor sensing air pressure in the shell-forming space.

The laser generator may change a shape and intensity of the laser beam using any one of a lens, a prism, axicon, a diffraction grating, a screen, and a neutral density filter.

The embodiment of an apparatus for manufacturing a shell for a resonator using a laser may further include: a first straight mover straightly reciprocating the laser generator in an X-axial direction; and a second straight mover straightly reciprocating the first straight mover in a Y-axial direction.

The embodiment of an apparatus for manufacturing a shell for a resonator using a laser according to the present disclosure may further include a laser elevator moving up and down the laser generator.

The embodiment of an apparatus for manufacturing a shell for a resonator using a laser according to the present disclosure may further include a plurality of substrate-fixing jig assemblies spaced over a top of the shell-forming frame and fixing a position of the substrate for manufacturing a shell by pressing a top of the substrate for manufacturing a shell.

The substrate-fixing jig assembly may include: a pressing jig disposed on the shell-forming frame to be able to move up and down and rotate; a jig-supporting spring disposed in the shell-forming frame and elastically supporting the pressing jig; and a substrate-pressing bolt fastened to the shell-forming frame through the pressing jig from above and enabling the pressing jig to press the top of the substrate for manufacturing a shell.

The pressing jig may have: a rotational shaft portion rotatably inserted in the shell-forming frame; and a substrate supporting portion protruding to a side from the rotational shaft portion and holding and supporting the top of the substrate for manufacturing a shell.

A lower sealing O-ring that is made of an elastic material and on which the substrate for manufacturing a shell is disposed may be disposed on the top of the shell-forming frame.

An upper shock-absorbing pad made of an elastic material and being in close contact with the top of the shell for manufacturing a shell may be disposed under a bottom of the substrate supporting portion.

A cooling gas spray unit spraying cooling gas to a bottom of the shell for manufacturing a shell out of an emission range of the laser beam may be disposed in the shell-forming frame.

The embodiment of an apparatus for manufacturing a shell for a resonator using a laser according to the present disclosure may further include an inner forming frame separably coupled in the shell-forming space of the shell-forming frame and having different shell-forming spaces therein.

In order to achieve the objectives of the present disclosure, a method of manufacturing a shell for a resonator using a laser includes: a forming frame preparation process of preparing a shell-forming frame that has a shell-forming space having an open top and being able to form a shell for a resonator, and on which a substrate for manufacturing a shell that is deformed by a laser is disposed; a substrate fixing process of placing and fixing the substrate for manufacturing a shell that is thermally deformed by a laser on the top of the shell-forming frame; a shell forming process of forming a 3D shell for a resonator while emitting a laser beam to the substrate for manufacturing a shell fixed in the substrate fixing process and while adjusting a degree of vacuum in the shell-forming space; and a cooling process of cooling the formed shell for a resonator.

The embodiment of a method of manufacturing a shell for resonator using a laser may further include a heat treatment process of thermally processing the cooled shell for a resonator.

The substrate fixing process may close tightly the open top of the shell-forming space by bonding or joining the substrate for manufacturing a shell to the top of the shell-forming frame.

According to the present disclosure, it is possible to stably manufacture 3D shells for a resonator in various shapes by applying heat through a laser and adjusting the degree of vacuum in a forming frame, it is possible to improve work safety and work efficiency, and it is possible to use various materials that are heated and deformed by a laser other than a glass material, so there is an effect that it is possible to increase generality in manufacturing.

According to the present disclosure, it is possible to precisely manufacture a 3D shell for a resonator in a predetermined shape by applying heat through a laser and adjusting the degree of vacuum in a forming frame, and particularly, it is possible to accurately implement 3D shapes of a shell for a resonator such as a hemisphere or a semi-toroid, so there is an effect that it is possible to remarkably reduce a defective portion in manufacturing and the manufacturing cost, and considerably improve productivity.

BRIEF DESCRIPTION OF THE DRAWINGS

The above and other objectives, features and advantages of the present disclosure will be more clearly understood from the following detailed description taken in conjunction with the accompanying drawings, in which.

DESCRIPTION OF THE PREFERRED EMBODIMENTS

The present disclosure is described in detail hereafter.

Exemplary embodiments of the present disclosure are described hereafter in detail with reference to the accompanying drawings. Before describing the present disclosure, it should be noted that the terms or terminologies used herein and claims should not be construed as common meanings or the meanings in dictionaries. Therefore, the configurations described in the embodiments and drawings of the present disclosure are merely most preferable embodiments but do not represent all of the technical spirit of the present invention. Thus, it should be understood that the present disclosure should be construed as including all the changes, equivalents, and substitutions included in the spirit and scope of the present disclosure at the time of filing this application.

Figure 1:
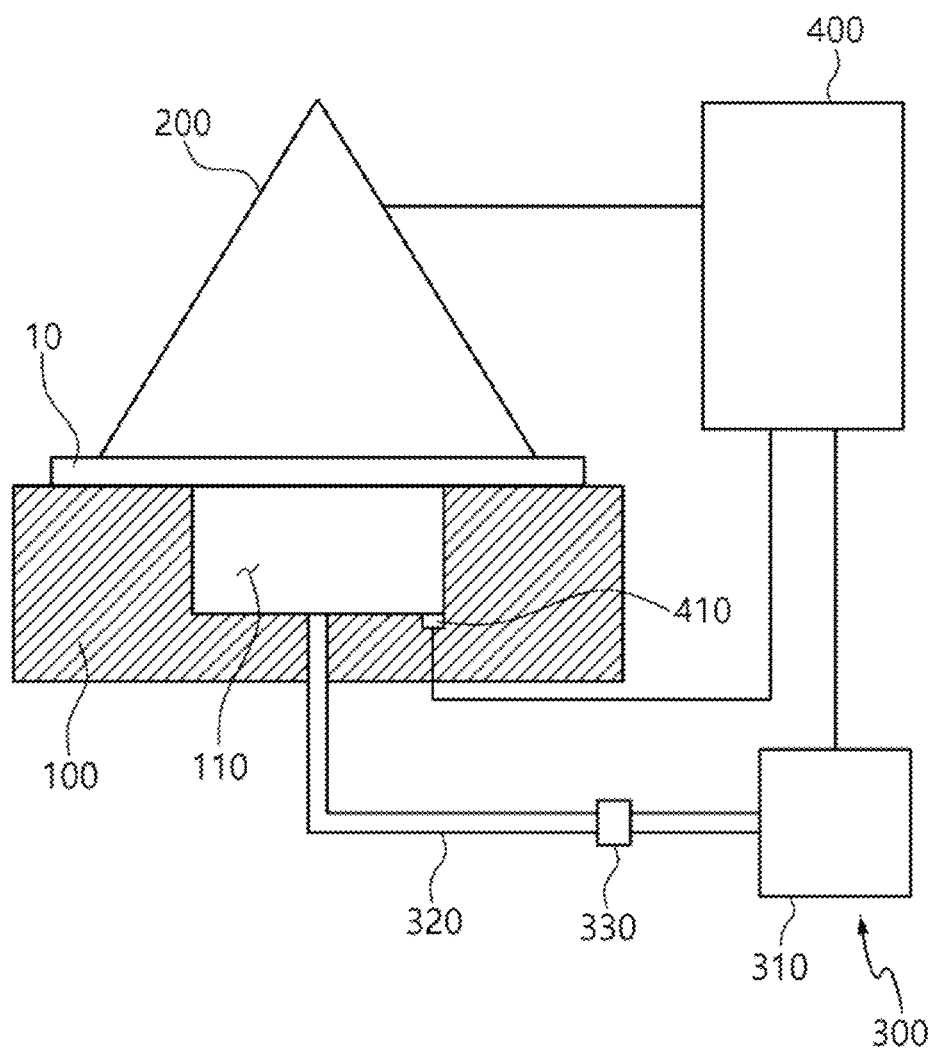
FIG. 1 is a schematic view showing an embodiment of an apparatus for manufacturing a shell for a resonator using a laser according to the present disclosure.

FIG. 1 is a schematic view showing an embodiment of an apparatus for manufacturing a shell for a resonator using a laser according to the present disclosure. An embodiment of an apparatus for manufacturing a shell for a resonator using a laser according to the present disclosure is described in detail hereafter with reference to FIG. 1.

An embodiment of an apparatus for manufacturing a shell for a resonator using a laser according to the present disclosure includes a shell-forming frame 100 having a shell-forming space 110 that has an open top and can form a shell for a resonator.

A substrate 10 for manufacturing a shell is disposed on the top of the shell-forming frame 100, thereby covering tightly the open top of the shell-forming space 110.

The substrate 10 for manufacturing a shell is bonded to the top of the shell-forming frame 100, thereby covering tightly the open top of the shell-forming space 110.

The substrate 10 for manufacturing a shell is, for example, glass that can manufacture a shell for a resonator of a gyroscope, and it should be noted that the substrate may be substrates made of various materials that can be thermally deformed by a laser beam.

A vacuum pump unit 300 that adjusts the degree of vacuum in the shell-forming space 110 is connected to the bottom of the shell-forming space 110.

The vacuum pump unit 300 is connected to the center of the bottom of the shell-forming space 110 and adjusts the degree of vacuum in the shell-forming space 110 by discharging the air in the shell-forming space 110 to the outside or pumping external air into the shell-forming space 110.

The vacuum pump unit 300 is connected to the center of the bottom of the shell-forming space 110 and adjusts the degree of vacuum in the shell-forming space 110 while maximally uniformly discharging the air from the entire shell-forming space 110 or maximally uniformly supplying external air when pumping the external air into the shell-forming space 110. As the degree of vacuum is adjusted, a 3D-shape that is formed in the shell-forming space 110 is formed in the shape of a predetermined shell for a resonator A vacuum line 320 of the vacuum pump unit 300 is connected to the center of the bottom of the shell-forming space 110 and an air inlet/outlet for discharging the air in the shell-forming space 110 or taking air into the shell-forming space 110 is formed at the center.

The vacuum pump unit 300 includes a vacuum pump 310 suctioning the air from the shell-forming space 110 or supplying air into the shell-forming space 110, and a vacuum line 320 connecting the vacuum pump 310 and the shell-forming space 110, that is, the air inlet/outlet.

The vacuum pump unit 300 may further include a vacuum degree control valve 330 that opens/closes the channel of the vacuum line 320.

The vacuum pump 310 and the vacuum degree control valve are connected to a controller 400 and are controlled to operate by the controller 400, thereby adjusting the degree of vacuum in the shell-forming space 110.

The controller 400 includes an air pressure sensor 410 that senses the air pressure in the shell-forming space 110 and controls the operation of the vacuum pump 310 on the basis of air pressure sensed by the air pressure sensor 410, thereby adjusting the degree of vacuum in the shell-forming space 110.

It should be noted that the shell-forming space 110 is a forming space for thermally deforming the substrate 10 for manufacturing a shell into a 3D shape and may be separately formed in various shapes, depending on the shape of shells for a resonator.

The laser generator 200 thermally deforms the substrate 10 for manufacturing a shell on the shell-forming frame 100 by heating the substrate 10 for manufacturing a shell by emitting a laser beam to the substrate 10 for manufacturing a shell.

The laser generator 200 can variously change the shape and the intensity of the laser beam using a lens, a prism, axicon, a diffraction grating, a screen, a neutral density filter, etc.

According to the apparatus for manufacturing a shell for a resonator using a laser of the present disclosure, it is possible to manufacture a shell for a resonator while heating the substrate 10 for manufacturing a shell on the shell-forming frame 100 by emitting a laser beam to the substrate 10 using the laser generator 200 and while adjusting the degree of vacuum in the shell-forming space 110 using the vacuum pump unit 300.

FIG. 2A to 2H are views showing examples of a laser beam shape that is generated by the laser generator 200 in the apparatus for manufacturing a shell for a resonator using a laser according to the present disclosure and FIGS. 3A to 3H are views showing examples of the shape of a substrate that is deformed in accordance with a laser beam shape in the apparatus for manufacturing a shell for a resonator using a laser according to the present disclosure.

Figure 2A:
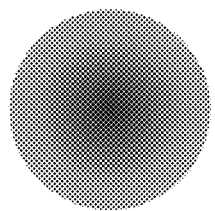
FIGS. 2A to 2H are views showing examples of a laser beam shape that is generated by a laser generator in the apparatus for manufacturing a shell for a resonator using a laser according to the present disclosure.
Figure 2B:

Referring to FIGS. 2A to 2H, the laser generator 200 can change the size of a laser beam, as shown in FIGS. 2A and 2B, using a lens, and can change the position of the laser beam by adjusting the position of the lens.

Figure 2C:
Figure 2D:
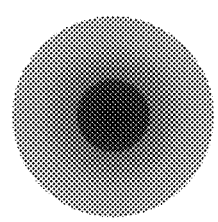

The laser generator 200 can heat a substrate in a ring shape by making the beam in a donut shape using axicon or a diffraction grating, as shown in FIG. 2C, and can further heat a specific portion by overlapping two laser beams, as shown in FIG. 2D.

Figure 2E:
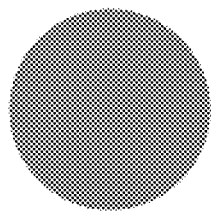
Figure 2F:
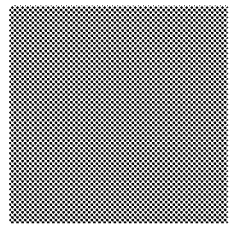

The laser generator 200 can uniformly heat an entire substrate by making the intensity distribution of the beam uniform or changing the shape of the beam using a lens or a diffraction grating, as shown in FIGS. 2E and 2F.

Figure 2G:
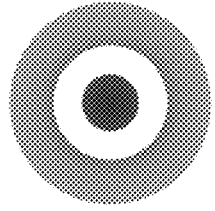
Figure 2H:
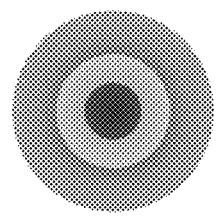

The laser generator 200 can prevent a specific portion of a substrate from being heated by blocking a portion of the laser beam using a screen, as shown in FIG. 2G, or can partially adjust a temperature change of the substrate using a neutral density filter, as shown in FIG. 2H.

The laser beam 200 can deform a substrate while forming various laser beams in accordance with the shape of pre-designed shells for a resonator by changing the laser beam into various shapes or by adding a laser beam or partially removing the laser beam.

Figure 3A:
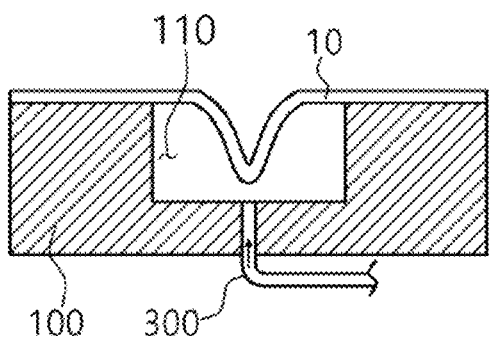
FIGS. 3A to 3H are views showing examples of the shape of a substrate that is deformed in accordance with a laser beam shape in the apparatus for manufacturing a shell for a resonator using a laser according to the present disclosure.

Referring to FIGS. 3A to 3H, the deformed substrate 10 for manufacturing a shell made of a glass material shown in FIG. 3A shows an expected shape of a substrate 10 for manufacturing a shell made of a glass material and deformed when the cross-sectional shape of the laser beam is a Gaussian shape that is wide to be able to be emitted to the entire substrate 10 for manufacturing a shell made of a glass material, as shown in FIG. 2A.

Figure 3B:
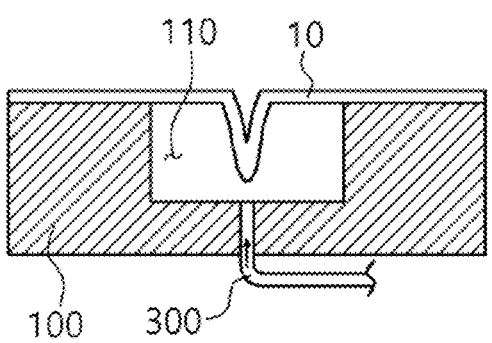

The deformed substrate 10 for manufacturing a shell made of a glass material shown in FIG. 3B shows an expected shape of a substrate 10 for manufacturing a shell made of a glass material and deformed when the cross-sectional shape of the laser beam is a Gaussian shape that is narrow, as shown in FIG. 2B.

Figure 3C:
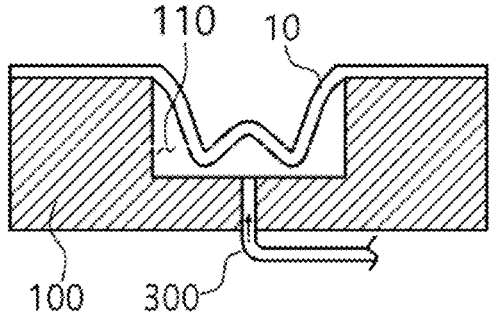

The deformed substrate 10 for manufacturing a shell made of a glass material shown in FIG. 3C shows an expected shape of a substrate 10 for manufacturing a shell made of a glass material and deformed when the cross-section of the laser beam is a ring shape, as shown in FIG. 2C.

Figure 3D:
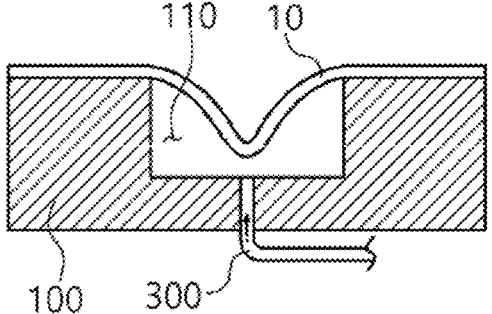

The deformed substrate 10 for manufacturing a shell made of a glass material shown in FIG. 3D shows an expected shape of a substrate 10 for manufacturing a shell made of a glass material and deformed when the cross-section of the laser beam is a combination of a wide Gaussian shape and a narrow Gaussian shape, as shown in FIG. 2D.

Figure 3E:
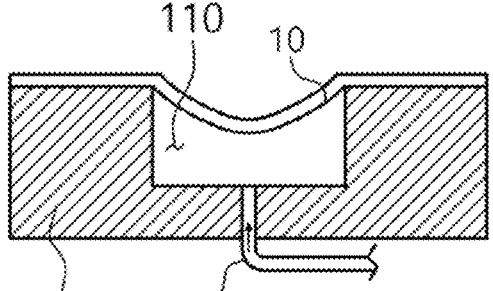

The deformed substrate 10 for manufacturing a shell made of a glass material shown in FIG. 3E shows an expected shape of a substrate 10 for manufacturing a shell made of a glass material and deformed when the cross-section of the laser beam has uniform distribution, as shown in FIG. 2E or FIG. 2F.

Figure 3F:
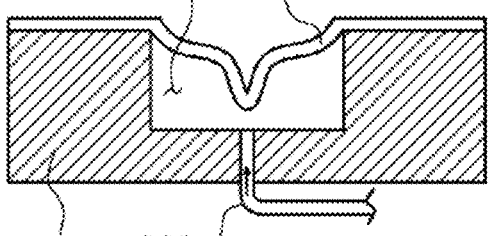

The deformed substrate 10 for manufacturing a shell made of a glass material shown in FIG. 3F shows an expected shape of a substrate 10 for manufacturing a shell made of a glass material and deformed when the cross-section of the laser beam is a combination of a ring shape and a narrow Gaussian shape, as shown in FIG. 2G.

The deformed substrate 10 for manufacturing a shell made of a glass material shown in FIG. 3F may be deformed in a shape similar to the deformed substrate 10 for manufacturing a shell made of a glass material shown in FIG. 3F even though it is primarily deformed by a laser beam having the cross-sectional shape shown in FIG. 2E or 2F and then secondarily deformed by the same laser beam.

Figure 3G:
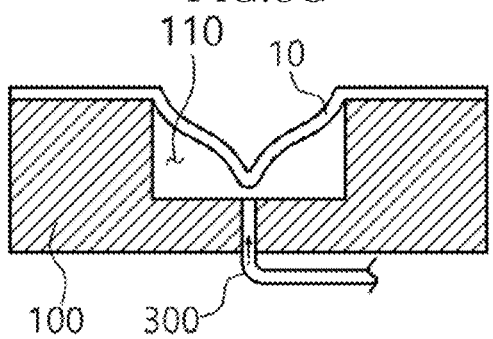
Figure 3H:
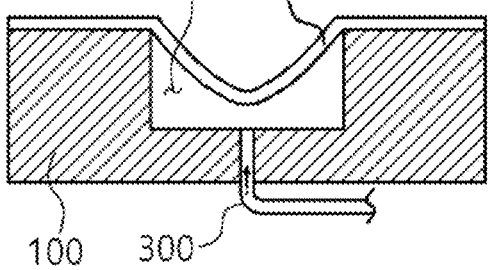

The deformed substrate 10 for manufacturing a shell made of a glass material shown in FIG. 3G shows an expected shape of a substrate 10 for manufacturing a shell made of a glass material and deformed when the cross-section of the laser beam is a combination of two narrow and wide Gaussian shapes, as shown in FIG. 2H.

The deformed substrate 10 for manufacturing a shell made of a glass material in FIG. 3C shows lager glass deformation when the cross-section of the laser beam has the shape shown in FIG. 2H and the pressure difference between the inside and the outside of the shell-forming space 110 is increased.

Figure 4:
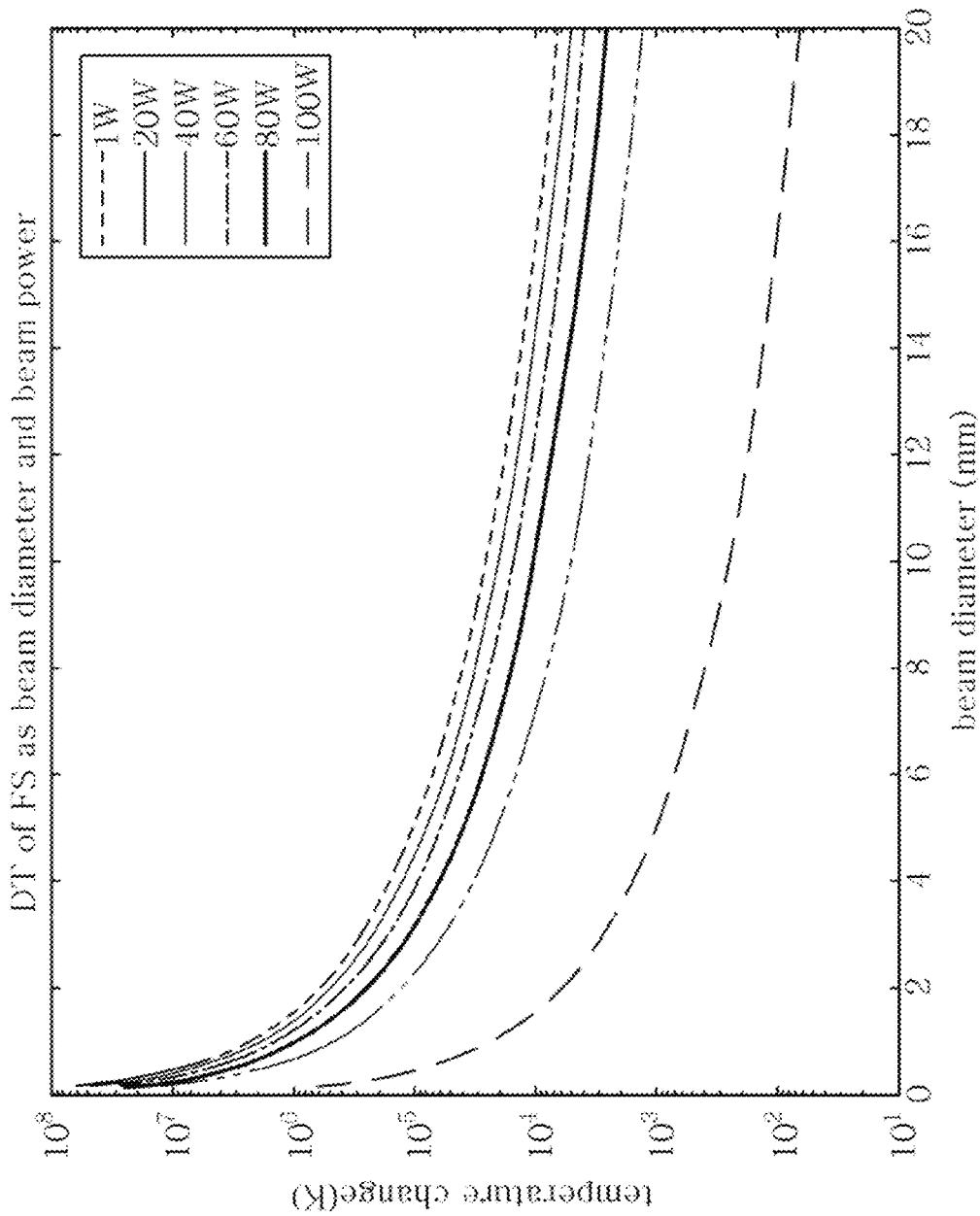
FIG. 4 is a graph showing a temperature change of a glass substrate made of fused silica material that is calculated when the glass substrate is exposed to a laser beam having a wavelength of 10 μm and the laser beam shape shown in FIG. 2E.

FIG. 4 is a graph showing a temperature change of a glass substrate made of fused silica material that is calculated when the glass substrate is exposed to a laser beam having a wavelength of 10 μm and the laser beam shape shown in FIG. 2E.

In order the calculate the temperature change, the exposition time of the laser beam was 1 seconds and the absorption coefficient of the fused silica at the wavelength of 10 μm was $2 \times 10^5$ m$^{-1}$, in which the thickness of the glass substrate was assumed as 500 μm and an increase of the absorption coefficient of the fused silica due to an increase of temperature was ignored.

Further, the temperature change was calculated while the diameter of the laser beam was increased up to 20 mm.

Considering that CO2 laser on the market can output hundreds of W in the wavelength range of 10 μm and the softening temperature of the fused silica is 1550° C., it can be seen that the apparatus and method of manufacturing a shell for resonator using a laser can be widely used to manufacture not only a shell for a resonator in the unit of cm over 20 mm, but also a shell for a small resonator in the unit of mm.

Figure 5:
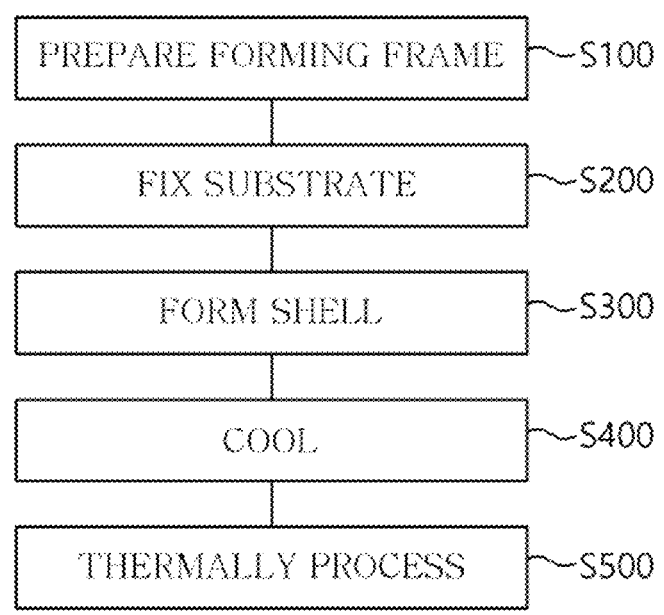
FIG. 5 is a flowchart showing an embodiment of a method of manufacturing a shell for a resonator using a laser according to the present disclosure.

FIG. 5 is a flowchart showing an embodiment of a method of manufacturing a shell for a resonator using a laser according to the present disclosure. Referring to FIG. 5, an embodiment of a method of manufacturing a shell for resonator using a laser includes: a forming frame preparation process of preparing a shell-forming frame 10 that has a shell-forming space 110 having an open top and being able to form a shell for a resonator, and on which a substrate 10 for manufacturing a shell that is deformed by a laser is disposed (S100); a substrate fixing process of placing and fixing the substrate 10 for manufacturing a shell that is thermally deformed by a laser on the top of the shell-forming frame 100 (S200); a shell forming process of forming a 3D shell for a resonator while emitting a laser beam to the substrate 10 for manufacturing a shell fixed in the substrate fixing process (S200) and while adjusting the degree of vacuum in the shell-forming space 110 (S300); and a cooling process of cooling the formed shell for a resonator (S400).

An embodiment of a method of manufacturing a shell for resonator using a laser may further include a heat treatment process of thermally treating the cooled shell for a resonator (S500).

The forming frame preparation process (S100) is to prepare a shell-forming frame 100 on which the substrate 10 for manufacturing a shell is fixed and that forms the substrate 10 for manufacturing a shell into the shape of a pre-designed shell for a resonator, and the shell-forming space 110 may be implemented in various shapes in accordance with the shape of shells for resonator to be manufactured.

That is, the forming frame preparation process (S100) prepares a shell-forming frame 100 having a shell-forming space 110 that is fitted to the shape of a shell for a resonator to be manufactured, that is, that can form the shape of a shell for a resonator to be manufactured.

The substrate fixing process (S200) closes tightly the open top of the shell-forming space 110 by bonding or joining the substrate 10 for manufacturing a shell to the top of the shell-forming frame 100 using epoxy for vacuum or a well-known method such as glass-flit so that the degree of vacuum in the shell-forming space 110 can be precisely adjusted by the vacuum pump unit 300.

The shell-forming process (S300) is to form a 3D shell for a resonator while emitting a laser beam to the substrate 10 for manufacturing a shell and adjusting the degree of vacuum in the shell-forming space 110. Referring to FIGS. 2A to 3H, it is possible to manufacture a pre-designed shell for a resonator in an accurate shape while selectively using laser beams having various cross-sectional shape and controlling the degree of vacuum in the shell-forming space 110 through the vacuum pump unit 300.

The embodiments shown FIGS. 2A to 3H were described above, so it should be noted that repeated description is not provided.

The cooling step (S400) cools the portion thermally heated, that is, the portion formed in the shape of the pre-designed shell for a resonator so that the deformed shape can be maintained.

The heat treatment process (S500) is to improve a characteristic (Q value) of a resonator by thermally treating the shell for a resonator formed by thermally deforming a glass material. In this process, it should be noted that the shell may be variously deformed by well-known heat treatment methods in accordance with the characteristic of the glass material, heat treatment may be omitted, depending on the material of the substrate 10 for manufacturing a shell, and the shell may be variously deformed by well-known heat treatment methods in accordance with the characteristic of materials.

Figure 6:
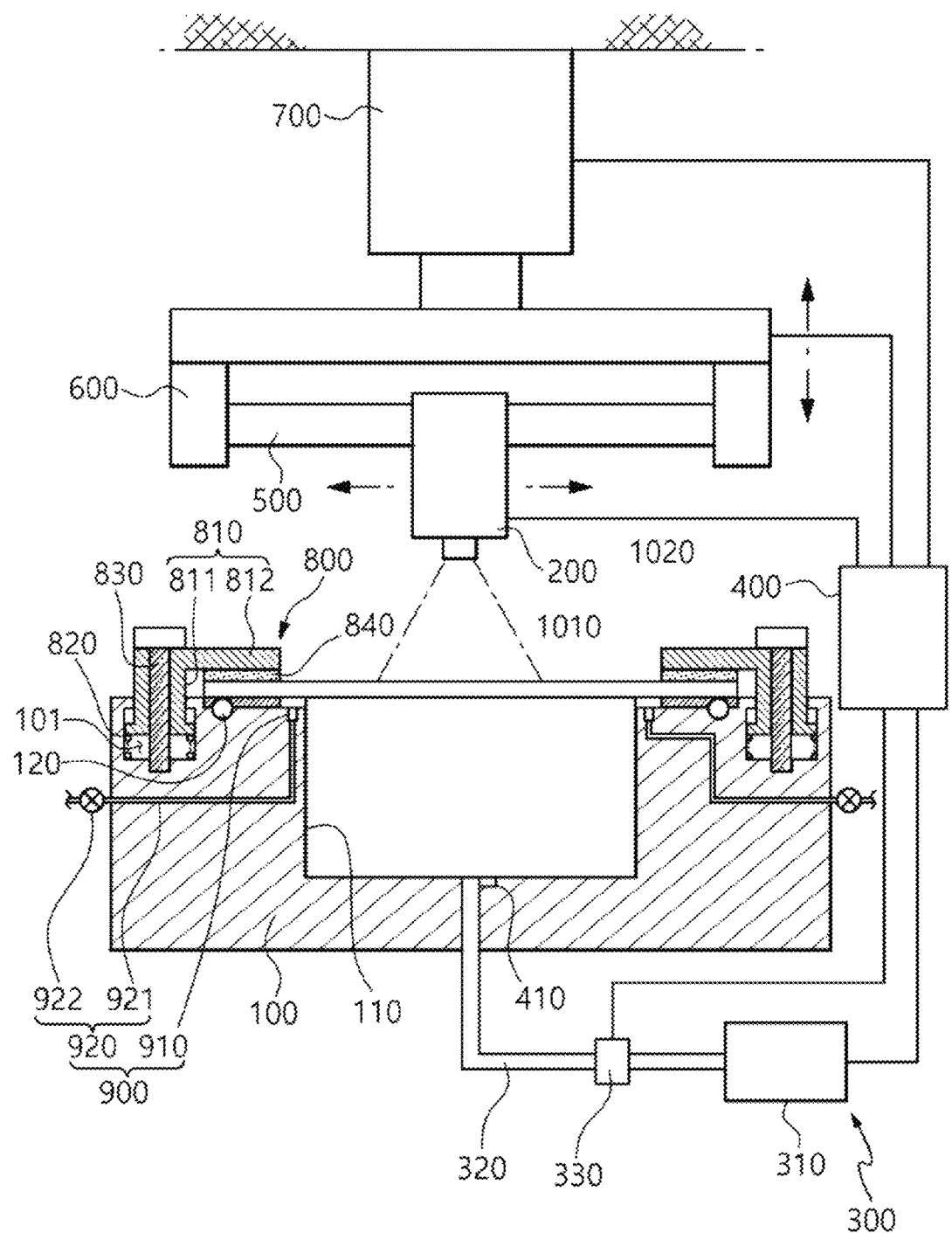
FIG. 6 is a schematic view showing another embodiment of an apparatus for manufacturing a shell for a resonator using a laser according to the present disclosure.
Figure 7:
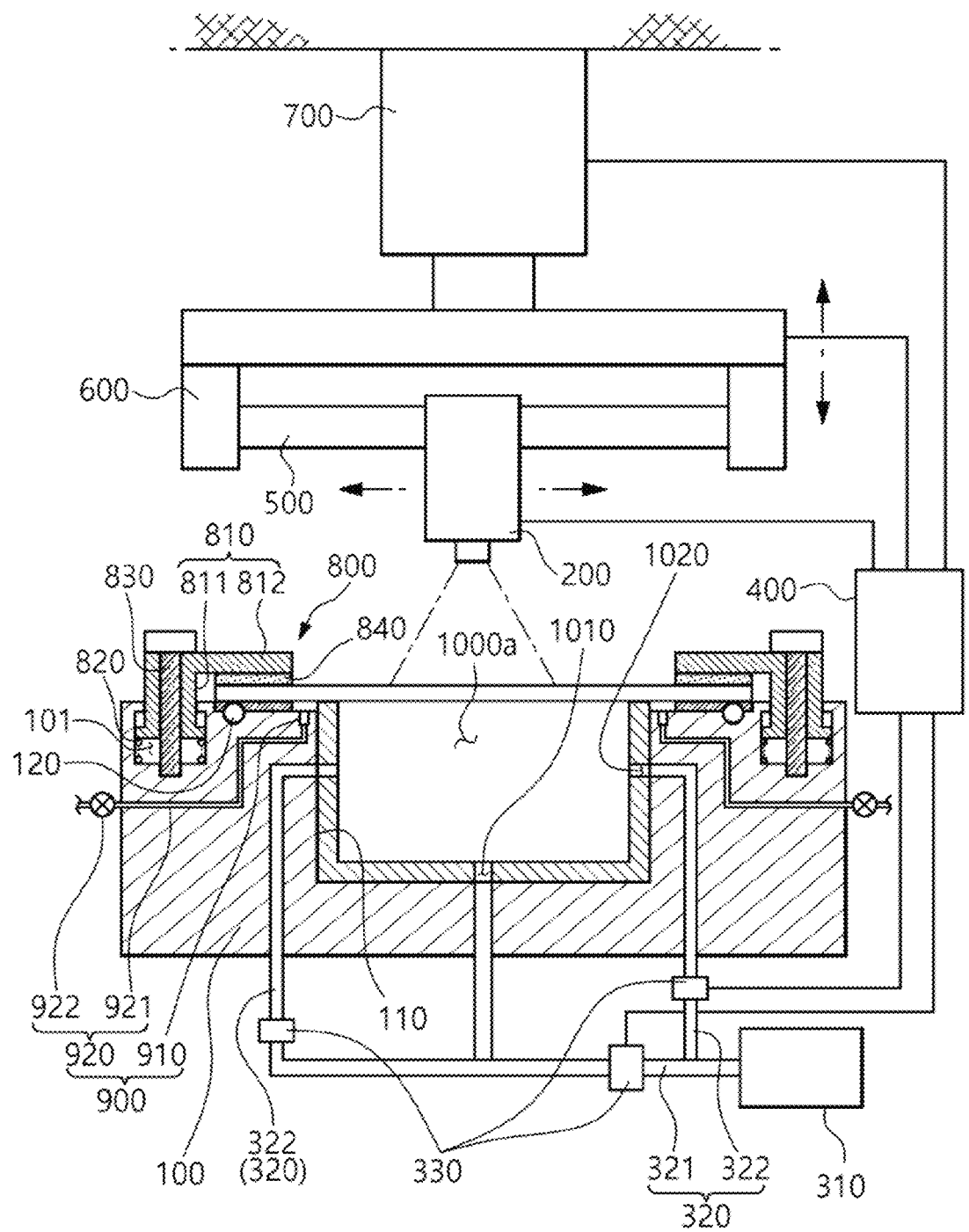
FIG. 7 is a schematic view showing another embodiment of an apparatus for manufacturing a shell for a resonator using a laser according to the present disclosure.

FIG. 6 is a schematic view showing another embodiment of an apparatus for manufacturing a shell for a resonator using a laser according to the present disclosure and FIG. 7 is a schematic view showing another embodiment of an apparatus for manufacturing a shell for a resonator using a laser according to the present disclosure.

Referring to FIGS. 6 and 7, another embodiment of an apparatus for manufacturing a shell for a resonator using a laser according to the present disclosure may further include a first straight mover 500 straightly reciprocating the laser generator 200 in the X-axial direction and a second straight mover 600 straightly reciprocating the first straight mover in the Y-axial direction.

The embodiment of an apparatus for manufacturing a shell for a resonator using a laser according to the present disclosure may further include a laser elevator 700 moving up and down the laser generator 200.

The laser elevator 700 moves up and down the first straight mover 500 and the laser generator 200 that is reciprocated by the first straight mover 500 by moving up and down the second straight mover 600.

The first straight mover 500 and the second straight mover 600, for example, are ball screw-type linear actuators, but may be modified in various ways using well-known moving devices such as a rack and pinion structure that includes a rack gear and a pinion gear engaged with the rack gear and rotated by a motor and converts torque from the motor into straight movement, so it should be noted that detailed description is not provided.

The laser elevator 700, for example, is a hydraulic cylinder, but may be modified in various ways using well-known elevating devices such as a ball screw-type actuator or a rack and pinion structure that includes a rack gear and a pinion gear engaged with the rack gear and rotated by a motor and converts torque from the motor into straight movement, so it should be noted that detailed description is not provided.

The first straight mover 500 and the second straight mover 600 make it possible to manufacture more varied shapes of shells for a resonator by adjusting the position of a laser beam emitted to the substrate 10 for manufacturing a shell by moving the laser generator 200 in the X-axial direction or the Y-axial direction in a plane.

The laser elevator 700 makes it possible to manufacture more varied shapes of shells for a resonator by adjusting the size and intensity of an emitted laser beam by adjusting the emission height of the laser beam by moving up and down the laser generator 200.

That is, the embodiment of an apparatus for manufacturing a shell for a resonator using a laser according to the present disclosure manufactures a 3D shell for a resonator while applying heat using a laser and adjusting the degree of vacuum in the forming frame and can manufacture more varied shapes of 3D shell for a resonator by adjusting the emission position and the emission height of a laser beam.

The embodiment of an apparatus for manufacturing a shell for a resonator using a laser according to the present disclosure may further include a plurality of substrate-fixing jig assemblies 800 that is spaced over the top of the shell-forming frame 100 and fixes the position of the substrate 10 for manufacturing a shell by pressing the top of the substrate 10 for manufacturing a shell.

The substrate-fixing jig assembly 800 may include a pressing jig 810 that is disposed on the shell-forming frame 100 to be able to move up and down and rotate, a jig-supporting spring 820 that is disposed in the shell-forming frame 100 and elastically supports the pressing jig 810, and a substrate-pressing bolt 830 that is fastened to the shell-forming frame 100 through the pressing jig 810 from above and enables the pressing jig 810 to press the top of the substrate 10 for manufacturing a shell.

A jig hole 101 that is open upward and in which the pressing jig 810 is inserted to be able to rotate and move up and down is formed in the upper portion of the shell-forming frame 100. The jig-pressing spring 820 elastically supports the pressing jig 810 in the jig hole 101, is compressed when the pressing jig 810 moves down and presses the substrate 10 for manufacturing a shell, and moves up the pressing jig 810 when the jig-pressing bolt 830 is loosened from the shell-forming frame 100 such that the substrate 10 for manufacturing a shell can be released.

The jig-pressing bolt 830, which is a bolt having a head at the top, vertically passes through the pressing jig 810 and is fastened to the shell-forming frame 100 in the bottom of the jig hole 101, thereby fixing the position of the substrate 10 for manufacturing a shell by pressing the top of the substrate 10 for manufacturing a shell through the pressing jig 810.

The pressing jig 810 has a rotational shaft portion 811 inserted in the jig hole 101 and a substrate supporting portion 821 protruding to a side from the rotational shaft portion 811 and holding and supporting the top of the substrate 10 for manufacturing a shell. Accordingly, the pressing jig 810 can rotate with the rotational shaft portion 811 to be positioned such that the substrate supporting portion 821 holds and supports the top of the substrate 10 for manufacturing a shell or to be positioned out of the top of the substrate 10 for manufacturing a shell.

When the pressing jig rotate rotates with the rotational shaft portion 811 to be positioned such that the substrate supporting portion 821 holds and supports the top of the substrate 10 for manufacturing a shell and when the substrate-pressing bolt 830 is fastened to the shell-forming frame 100, the pressing jig moves down and presses the top of the substrate 10 for manufacturing a shell, thereby fixing the position of the substrate 10 for manufacturing a shell.

When the substrate-pressing bolt 830 is loosened from the shell-forming frame 100, the pressing jig 810 is moved up by the elastic restoring force of the jig-supporting spring 820 and releases the pressed substrate 10 for manufacturing a shell. Further, when the substrate-pressing bolt 830 is rotated such that the substrate supporting portion 821 is positioned out of the top of the substrate 10 for manufacturing a shell, the substrate 10 for manufacturing a shell can be easily separated from the shell-forming frame 100 and a new substrate 10 for manufacturing a shell can be seated on the shell-forming frame 100.

A lower sealing O-ring 120 that is made of an elastic material and on which the substrate 10 for manufacturing a shell is disposed may be disposed on the top of the shell-forming frame 100.

The lower sealing O-ring 120 seals the space between the shell-forming frame 100 and the shell 10 for manufacturing a shell so that the vacuum pump unit 300 can adjust the degree of vacuum in the shell-forming space 110.

An upper shock-absorbing pad 840 that is made of an elastic material and is in close contact with the top of the shell 10 for manufacturing a shell may be disposed under the bottom of the pressing jig 810, that is, under the bottom of the substrate supporting portion 821.

The upper shock-absorbing pad 840 protects the shell 10 for manufacturing a shell and enables a 3D shell for a resonator to be stably manufactured from the shell 10 for manufacturing a shell by absorbing the shock that is generated when the pressing jig 810 fixes the position of the shell 10 for manufacturing a shell by pressing the shell 10 for manufacturing a shell and the shock generated by movement when the shell 10 for manufacturing a shell is formed.

The lower sealing O-ring 120 and the upper shock-absorbing pad 840 are made of an elastic material having excellent heat resistance such as heatproof rubber. Further, a cooling gas spray unit 900 that sprays cooling gas to the bottom of the shell 10 for manufacturing a shell out of the emission range of a laser beam is disposed in the shell-forming frame 100.

The cooling gas spray unit 900 includes a cooling gas spray nozzle 910 that sprays cooling gas to the bottom of the shell 10 for manufacturing a shell, and a cooling gas supplier 920 that supplies cooling gas to the cooling gas spray nozzle 910.

The cooling gas supplier 920, though not shown, includes a cooling gas tank (not shown) storing high-pressure cooling gas, a cooling gas supply pipe 921 connecting the cooling gas spray nozzle 910 and the cooling gas tank and supplying cooling gas to the cooling gas spray nozzle 910, and a cooling gas supply control valve 922 disposed in the cooling gas supply pipe 921 and opening/closing the channel of the cooling gas supply pipe 921, and sprays cooling gas stored in the cooling gas tank through the cooling gas spray nozzle 910.

The cooling gas spray unit 900 blocks the heat transferring to the lower sealing O-ring 120 and the upper shock-absorbing pad 820 when the shell 10 for manufacturing a shell is heated and thermally deformed by a laser beam, by spraying cooling gas to the bottom of the shell 10 for manufacturing a shell out of the emission range of the laser beam, thereby preventing thermal deformation of the lower sealing O-ring 120 and the upper shock-absorbing pad 820 that are made of an elastic material.

Referring to FIG. 7, another embodiment of an apparatus for manufacturing a shell for a resonator using a laser according to the present disclosure may further include an inner forming frame 1000 separably coupled in the shell-forming space 110 of the shell-forming frame 100 and having different shell-forming spaces 1000a therein.

The inner forming frame 1000 has the shell-forming space 110 therein that can form a shell for a resonator to be manufactured and is selectively inserted in the shell-forming space 110 of the shell-forming frame 100 such that various shapes of shells for a resonator can be manufactured.

The embodiment of an apparatus for manufacturing a shell for a resonator using a laser according to the present disclosure includes a main vacuum line 321 connecting the vacuum line 320 to the bottom of the shell-forming space 110, and a plurality of diverging vacuum lines 322 diverging from the main vacuum line 321 and connected to a side of the shell-forming space 110. A vacuum degree control valve 330 opening/closing each channel is disposed in each of the main vacuum line 321 and the diverging vacuum lines 322.

The vacuum pump unit 300 can more finely adjust the degree of vacuum in the shell-forming space 110 by individually controlling the amount of air suctioned from the shell-forming space 110 and the amount of air supplied into the shell-forming space 110 through the main vacuum line 321 and the diverging vacuum lines 322.

The inner forming frame 1000 is separably disposed in the shell-forming frame 100 with the outer side and the bottom respectively in close contact with the inner side and the bottom of the shell-forming space 110 of the shell-forming frame 100.

A plurality of diverging line connection holes 1020 connected with the diverging vacuum lines 322 is formed through the inner side of the inner forming frame 1000, and main line connection hole 1010 connected with the main vacuum line 321 is formed through the bottom of the inner forming frame 1000.

The inner forming frame 1000 is manufactured in various shapes having different shell-forming spaces 1000a therein and is selectively inserted into the shell-forming space 100 of the shell-forming frame 100, so shells for a resonator can be formed by the different shell-forming spaces. Accordingly, it is possible to manufacture various shapes of shells for a resonator using one shell-forming frame.

According to the present disclosure, it is possible to stably manufacture 3D shells for a resonator in various shapes by applying heat through a laser and adjusting the degree of vacuum in a forming frame, it is possible to improve work safety and work efficiency, and it is possible to use various materials that are heated and deformed by a laser other than a glass material, thereby being able to increase generality of manufacturing.

According to the present disclosure, it is possible to precisely manufacture a 3D shell for a resonator in a predetermined shape by applying heat through a laser and adjusting the degree of vacuum in a forming frame, and particularly, it is possible to accurately implement 3D shapes of a shell for a resonator such as a hemisphere or a semi-toroid, so it is possible to remarkably reduce a defective portion in manufacturing and the manufacturing cost, and considerably improve productivity.

The present disclosure is not limited to the embodiments described above and may be modified in various ways without departing from the scope of the present disclosure and the modifications should be construed as being included in the present disclosure.

What is claimed is:

1. An apparatus for manufacturing a shell for a resonator using a laser, the apparatus comprising:
   a shell-forming frame that has a shell-forming space having an open top and being able to form a shell for a resonator, and on which a substrate for manufacturing a shell that is deformed by a laser is disposed;
   a laser generator that thermally deforms the substrate for manufacturing a shell on the shell-forming frame by emitting a laser beam to the substrate for manufacturing a shell;
   a vacuum pump unit that is connected to the shell-forming space and deforms the substrate for manufacturing a shell heated by the laser beam into a 3D shape by adjusting a degree of vacuum in the shell-forming space, and
   a plurality of substrate-fixing jig assemblies spaced over a top of the shell-forming frame and fixing a position of the substrate for manufacturing a shell by pressing a top of the substrate for manufacturing a shell,
   wherein the substrate-fixing jig assembly comprises:
   a pressing jig disposed on the shell-forming frame to be able to move up and down and rotate;
   a jig-supporting spring disposed in the shell-forming frame and elastically supporting the pressing jig; and
   a substrate-pressing bolt fastened to the shell-forming frame through the pressing jig from above and enabling the pressing jig to press the top of the substrate for manufacturing a shell.

2. The apparatus of claim 1, wherein the vacuum pump unit comprises:
   a vacuum pump suctioning air from the shell-forming space or supplying air into the shell-forming space;
   a vacuum line connecting the vacuum pump and the shell-forming space; and
   a vacuum degree control valve opening or closing a channel of the vacuum line,
   wherein the vacuum pump and the vacuum degree control valve are connected to a controller and are controlled to operate by the controller, thereby adjusting the degree of vacuum in the shell-forming space.

3. The apparatus of claim 2, wherein the controller comprises an air pressure sensor sensing air pressure in the shell-forming space.

4. The apparatus of claim 1, wherein the laser generator changes a shape and intensity of the laser beam using any one of a lens, a prism, axicon, a diffraction grating, a screen, and a neutral density filter.

5. The apparatus of claim 1, further comprising:
a first straight mover straightly reciprocating the laser generator in an X-axial direction; and
a second straight mover straightly reciprocating the first straight mover in a Y-axial direction.

6. The apparatus of claim 1, further comprising a laser elevator moving up and down the laser generator.

7. The apparatus of claim 1, wherein the pressing jig comprises:
a rotational shaft portion rotatably inserted in the shell-forming frame; and
a substrate supporting portion protruding to a side from the rotational shaft portion and holding the top of the substrate for manufacturing a shell.

8. The apparatus of claim 7, wherein an upper shock-absorbing pad made of an elastic material and being in close contact with a top of the shell for manufacturing a shell is disposed under a bottom of the substrate supporting portion.

9. The apparatus of claim 8, wherein a cooling gas spray unit spraying cooling gas to a bottom of the shell for manufacturing a shell out of an emission range of the laser beam is disposed in the shell-forming frame.

10. The apparatus of claim 1, wherein a lower sealing O-ring, that is made of an elastic material and on which the substrate for manufacturing a shell is disposed, is disposed on the top of the shell-forming frame.

11. The apparatus of claim 1, further comprising an inner forming frame separably coupled in the shell-forming space of the shell-forming frame and having a different shell-forming space therein.

* * * * *